March 28, 1939.　　K. E. WHITNEY ET AL　　2,152,517
SCREW AND BOLT DRIVING AND NUT RUNNING MACHINE
Original Filed Aug. 6, 1934　　2 Sheets-Sheet 1
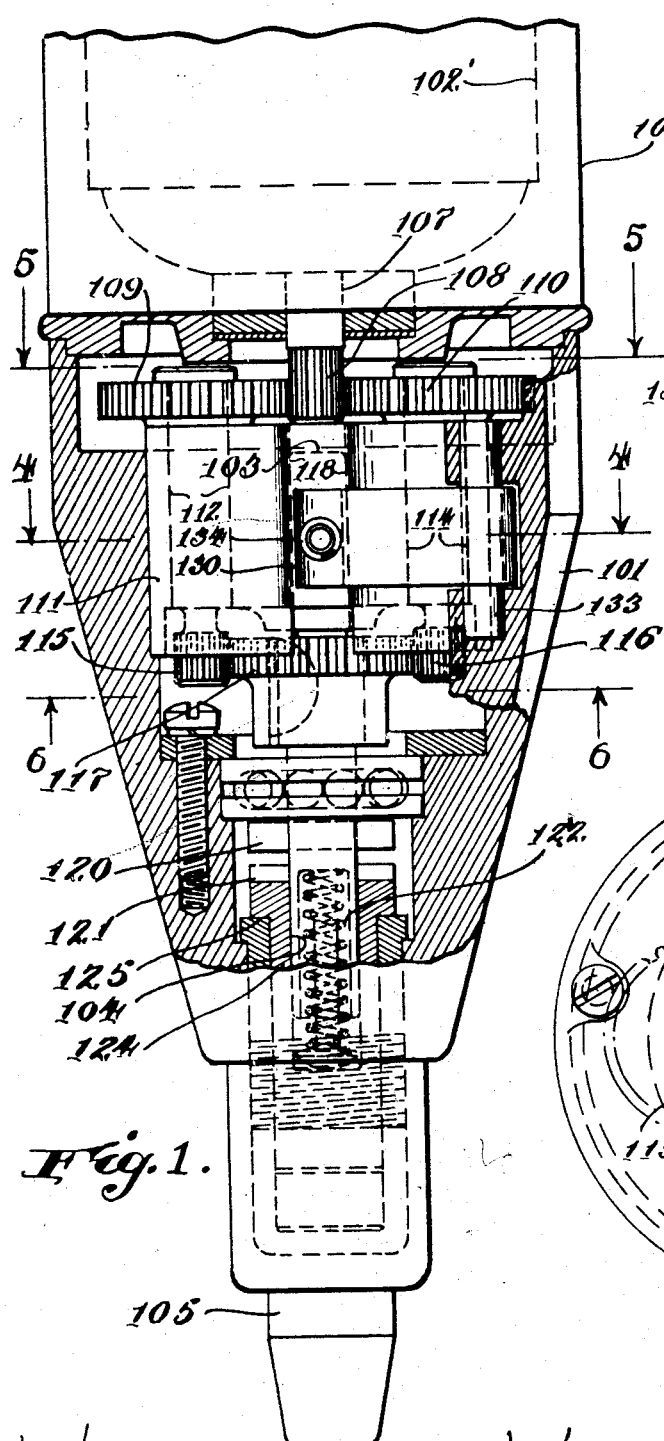
Fig. 1.
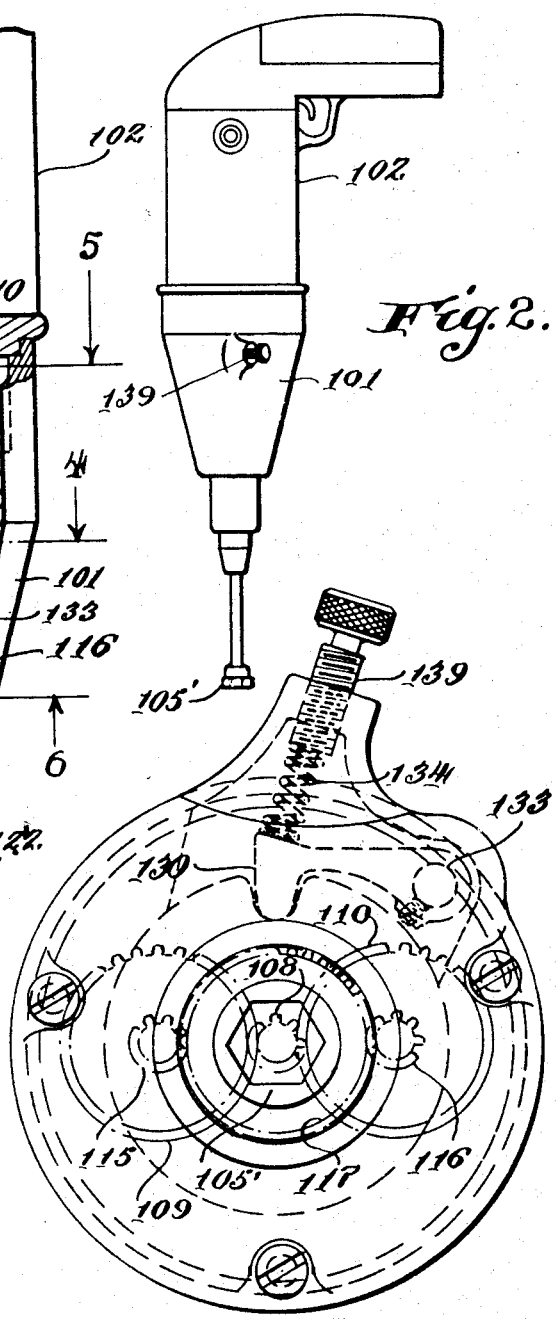
Fig. 2.
Fig. 3.

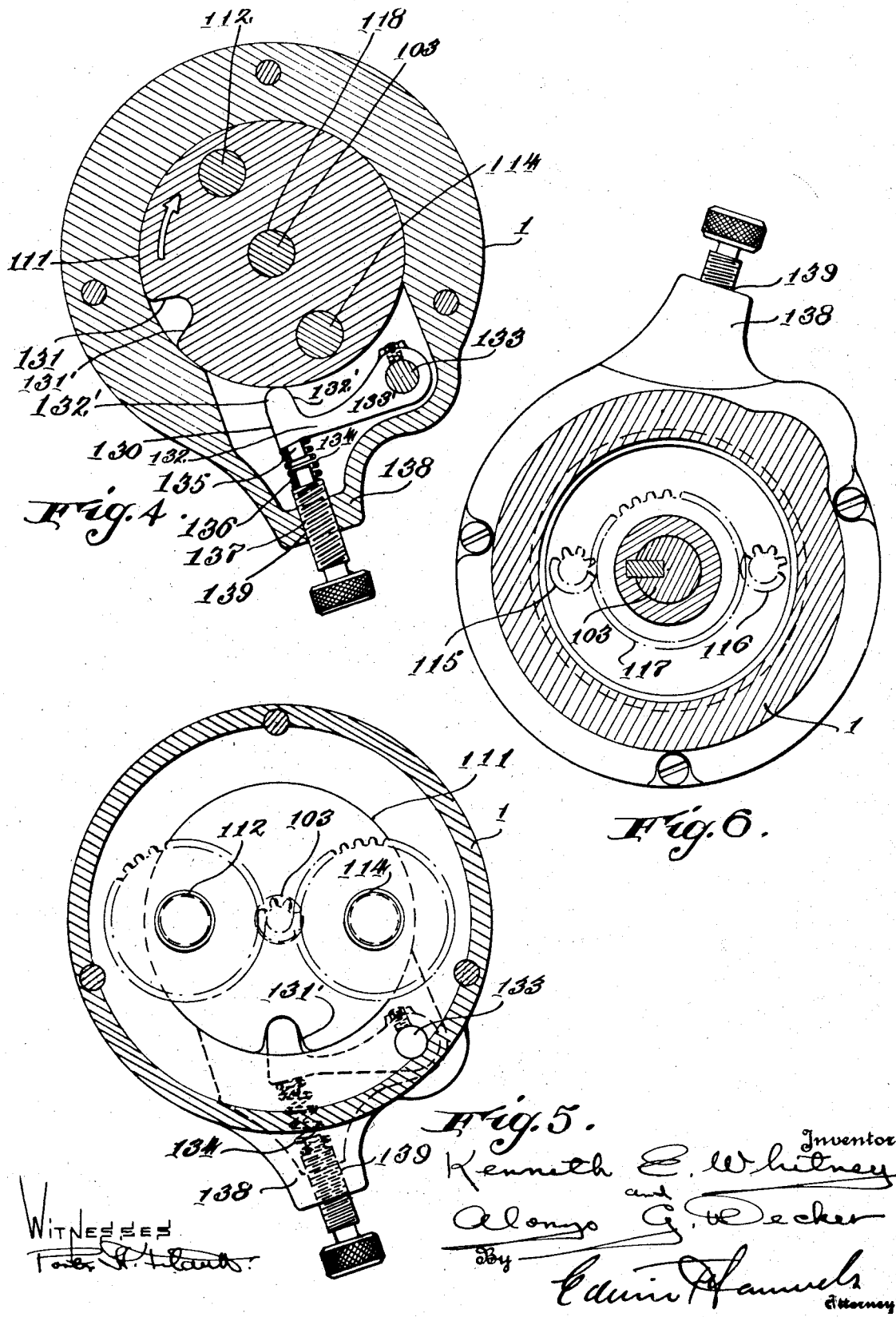

Patented Mar. 28, 1939

2,152,517

UNITED STATES PATENT OFFICE 2,152,517

SCREW AND BOLT DRIVING AND NUT RUNNING MACHINE

Kenneth E. Whitney, Baltimore, and Alonzo G. Decker, Towson, Md., assignors to The Black & Decker Manufacturing Company, a corporation of Maryland Original application August 6, 1934, Serial No. 738,670. Divided and this application February 23, 1938, Serial No. 192,146. Renewed February 11, 1939

7 Claims. (Cl. 81—57)

This application is a division of our co-opending application, Serial No. 738,670, filed August 6, 1934, "Screw and bolt driving and nut running machine", now Patent No. 2,130,111, dated Sept. 13, 1938.

The invention relates to an improvement in screw and bolt driving and nut running which is adaptable in the form shown to the portable power-driven hand-controlled type of machine, providing an improved drive with an adjustable torque limitation whereby the maximum torque applied to the spindle which carries the screw driver bit, or wrench, is limited, so that a screw or a nut or bolt can be driven or set to a point where it presents a pre-determined resistance to further driving or setting.

Objects of the invention are to provide an improved form of limited torque driving connection for use in a portable electric or other tool for driving screws, nuts and bolts which is so arranged that the torque at which the drive is discontinued may be quickly adjusted at the will of the operator to suit the work, i. e., the size of nut, screw or bolt and the tension at which it is to be set, and the release takes place automatically at a uniform accurately predetermined torque.

In the accompanying drawings, we have illustrated a portable power-driven tool, embodying the features of the invention in the preferred form.

In the drawings.

Figure 1 is a fragmentary vertical section taken through the gear casing on a plane of the axis of the tool showing the tool of the invention.

Figure 2 is an elevation of the tool on a reduced scale.

Figure 3 is a bottom plan view of the same.

Figure 4 is a section on the line 4, 4, in Figure 1 looking downwardly showing the lock disengaged.

Figure 5 is a view on line 5, 5 in Figure 1 showing the lock engaged.

Figure 6 is a section on the line 6, 6 in Figure 1 looking upwardly.

The invention provides in the form shown in the drawing a planetary gear drive for this type of tool which is constructed to give a release or termination of the continuous drive at a predetermined maximum torque and a tangential tapping action which is applied thereafter till the tool is withdrawn from the work. This may be used to set the nut, screw or bolt beyond the point where driving is terminated at the predetermined torque. The tangential tapping or series of impulses is the result of the rotary momentum of the tool parts accumulated in each period free rotation between successive engagements of the planetary drive with the spindle. This form of tool indicates the termination of the continuous screw driving, bolt setting and nut running operation at a predetermined torque by the tapping action which follows so that the operation may be then terminated if no further driving or setting by the tapping action is desired, the tool being removed from the work or the motor stopped. It is a primary object of this form of the invention to avoid the vibration of the tool in the direction of the axis which is incident to the operation of the jaw clutch previously employed as a maximum torque release in this general type of tool.

This form of tool includes a planetary gear train whereby the spindle is connected to the source of rotation, the planetary gear having a carrier with orbital gears and pinions eccentrically positioned thereon so that when the carrier is permitted to rotate, the gears and pinions rotate about the driving and driven gears connected to the source of rotation and to the spindle respectively without transmitting rotation to the spindle, and when the carrier is locked in fixed position, full speed rotation is transmitted to the spindle.

The manner of latching and releasing the carrier is an important feature of the invention in that up to a predetermined torque it has a positive action holding the carrier in a definite fixed position at the desired predetermined torque it is released, permitting the carrier to perform a single rotation or any portion thereof for which the tool may be adapted by location of the lock socket. Following this rotation period it is again engaged for an instant and if the torque remains the same or is increased, it is instantly released, the re-engagement effecting a tapping action proportionate to the momentum of the rotating parts accumulated during the period of free rotation. In this way an operation is accomplished which is exceedingly effective in setting nuts, bolts and screws beyond the point to which they can be set by the normal rotation of the tool and in setting there is a minimum of exertion on the part of the workman as the momentum referred to, together with the inertia of the tool, take up the bulk of the reaction incident to such tangential hammering, and there is no vibration in the direction of the axis as with the jaw clutch type of release which is tiring to the operator and destructive to the tool parts, and tends to disfigure the work.

Referring to the drawings, the construction shown comprises a gear casing 101, a motor casing 102, containing a motor 102' indicated in dotted lines, a planetary shaft 103 and a spindle 104 on the end of which is mounted a chuck 105 to receive the screw driver bit or wrench 105'.

Mounted on the motor shaft 107 is a pinion 108 which drives the orbital gears 109 and 110 which are located on the upper face of the rotary planetary gear carrier 111. The orbital gears 109 and 110 are secured to the upper ends of short shafts 112 and 114 which are eccentrically located in suitable bearings on the carrier through which they extend parallel to the axis, and orbital pinions 115 and 116 are mounted on the lower ends of these shafts below the carrier. These pinions have a driving engagement with the tool shaft gear 117 which is mounted on and secured to the tool shaft 103. This tool shaft has a bearing 118 extending through the center of the carrier 111 and the tool shaft and the carrier are rotatively engaged in and at said bearing, the carrier rotating about the center of the shaft, and vice versa.

In accordance with the form of the invention illustrated, the tool shaft and spindle are provided with cooperating jaw clutch members 120, 121, which move in the direction of the axis in the operation of engaging and disengaging, and the spindle is held normally depressed by a spring 122, the spindle 104 being for this purpose mounted to slide and rotate in a bearing 124, the upper end of which engages a downwardly disposed shoulder 125 on the spindle.

In order to effect the cessation of the screw driving and nut running operation at a maximum pre-determined torque, the carrier 111 is provided with a releasing lock shown at 130 in Figure 4. This lock engages in the locking position with a smoothly curved or tapered socket 131 which as shown extends inwardly from the peripheral surfaces of the carrier 111. The latch 130 which is shown as in the nature of a swinging pawl 132, although it may be otherwise designed, is provided with a correspondingly shaped tooth 132'. The pawl is shown as pivotally mounted on a stud 133 seated in the gear casing or housing above and below the locking pawl and spaced well backwardly from the pawl tooth 132', so that the pawl in entering and leaving the socket 131 moves in a substantially radial direction from which it may be slightly deflected in the extreme released position in which it is shown in Figure 4. The stud 133 is closely adjacent the periphery of the carrier.

In order to effect the engagement of the latch, it is urged forwardly toward and into the socket by a coiled spring 134 for which any suitable means may be substituted. This spring engages a stud 135 on the back of the pawl preferably in line with the tooth and at its opposite end it engages a stud 136 which, for purposes of adjustment, is carried by a screw 137 set in a suitable boss 138 on the outside of the gear housing through which the screw is passed, being threaded into a tapped hole 139 in said boss, and the pawl arm 133' is preferably elongated in its relation to the throw of the pawl so that in the release of the pawl the tooth moves in a substantially straight line. Any suitable type of release lock, to be released by the torque of the tool and automatically returned to locked position may be substituted for the particular mechanism described.

In the operation of the tool shown in the drawings the bit 105' being normally free to rotate to any desired angular position, is placed in engagement with the work, and pressure being applied to the tool in the direction of its axis, the jaw clutch 120, 121 is engaged and the switch having been closed, the spindle is rotated, it being understood that the locking pawl 132 or tooth 132' which holds the carrier 111 against rotation is normally engaged, there being a marked tendency when the current is discontinued for the tool to stop with the lock in engaged position.

If the tool were to stop, with the lock disengaged, as shown in Figure 4, it would be immediately engaged on rotation of the carrier 111, through a sufficient arc to bring the socket 131 into the path of the tooth of pawl 132, when the rotation of the carrier would be immediately stopped and the spindle would be driven through the planetary gearing. Such drive takes place from the drive pinion 108 through the gears 109 and 110, which are now rotated on fixed axes, their rotation being communicated to pinions 115 and 116 and hence to the tool shaft gear 117 and to tool shaft 103 and spindle 104. When the spindle is stopped, as hereinafter described, by the pre-determined resistance or an excess resistance, the carrier 111 rotates and the gears 109, 110, and the pinions 115, 116 merely roll about pinion 108 and the gear 117, having no driving action.

The pawl spring 134 of pawl or latch 133 being adjusted by means of the screw 137 to a tension corresponding to the pre-determined maximum torque, the manner of deciding upon the adjustment being similar to that already described, the pawl remains engaged until the screw nut or bolt has been driven and set up to a point where a resistive torque corresponding to the pre-determined torque to be exerted is encountered. At this point the curved or inclined side 131' of the socket 131 being encountered by the correspondingly curved or inclined surface 132'' of the pawl tooth or other yieldably releasable locking members or bolts 132', both of which surfaces are inclined backwardly and outwardly away from the radius at this point, the term "backwardly" being used in reference to the direction of rotation, tooth 132' is forced out of the socket 131 by the camming action of the surfaces against the pressure of the spring 134 and the drive is released.

The construction shown in the drawings differs from that described in the parent application in that by further rotation of the carrier 111, which rotation would continue so long as the current is supplied and the motor is energized, the socket 131 will be brought again into the path of the tooth 132' of the latch 130 and the latch will re-engage for an interval only. This serves to stop or check the rotation of the carrier and communicate a new driving impulse to the spindle from the driving pinion 108 through planetary gear 109, 110, 111, 115, 116, 117 in the usual manner of operation of such gearing.

The result is that due to the momentum of the rotary parts, i. e., the motor, the carrier 111 and the gears, which is exerted through the resistance of the latch in disengaging, a tap of considerable magnitude is applied to the work in a tangential direction tending to further set the nut, screw or bolt. This tapping operation is continued so long as the rotary moment at the source of rotation is maintained at a magnitude sufficient to release the lock, and the tool is maintained in engagement with the work at sufficient pressure to close the jaw clutch 120, 121 and hold it closed, this clutch being not intended to be released during the driving operation. The effect attained is similar to that attained by placing a wrench on a nut or bolt and tapping the handle in a tangential direction, it being understood in this connection that for use in removing as well as inserting nuts, bolts or screws, the tool may be provded with a reversible motor indicated at 102' and 6 or other suitable reversing device.

The tool illustrated and described in the drawings differs from the prior practice in that it provides a positive lock for the driving connection up to the maximum torque to be exerted by the tool determined by the adjustment 134, 135, 136 and therefore adjustable to a pre-determined point of release, the torque being independent of the pressure of the tool against the work and the tool being capable of being applied in such a way as to give a tangential hammering or tapping action for further setting or for removing a nut, screw or bolt whereby a resistive torque which is greater than that at which the tool releases is overcome and a nut, screw or bolt is set beyond the point of setting normally provided by this maximum torque release.

It is of particular importance that this positive locking action, and release, as well as the tapping action, are accomplished without any vibration whatever of the tool or of the parts in the direction of the axis and without shock to the workman, there being only a slight tendency of the tool to twist, i. e., the reaction to the momentum generated after each tangential tap or blow, the resulting torque being slight and being taken up to a large degree by the inertia of the tool.

We have thus described specifically and in detail a screw driving, nut running and bolt setting tool embodying the features of my invention in the preferred form in order that the manner of constructing, applying, operating and using the same may be fully understood, however, the specific terms herein are used descriptively rather than in a limiting sense, the scope of the invention being defined in the claims.

What we claim as new and desire to secure by Letters Patent is:

1. In a portable power-driven rotary tool for driving screws and bolts and running nuts, a source of rotary motion, a tool spindle, means for transmitting rotary motion from the source to the tool spindle, comprising a planetary drive having a rotary carrier, and orbital gear members positioned eccentrically on the carrier and connected to the source and to the tool spindle to drive the tool spindle when the carrier is stationary and to rotate without driving action when the carrier rotates, overload releasing means for latching the carrier to hold it stationary, the tool spindle being driven in rotation when the carrier is latched and being stationary when an excess resistive torque is encountered and the carrier rotates, the latching means for the carrier being provided with a resilient element tending to return it to engaging position whereby the carrier is stopped and rotated at intervals applying a series of tangential impulses to the work in the direction of the drive so long as the power is applied and the tool is held in operative engagement with the work.

2. In a portable power-driven rotary tool for driving screws and bolts and running nuts, a source of rotary motion, a tool spindle, means for transmitting rotary motion from the source to the tool spindle, comprising a planetary drive having a rotary carrier and orbital gear members positioned eccentrically on the carrier and connected to the source and the tool spindle to drive the tool spindle when the carrier is stationary and to rotate without driving action when the carrier rotates, overload releasing means, operating transversely to the tool axis for latching the carrier to hold it stationary, the spindle being driven in rotation when the carrier is latched and being stationary when an excess resistive torque is encountered and the carrier rotates, the latching means for the carrier being provided with a resilient element tending to return it to engaging position whereby, when an overload is encountered, the carrier is stopped and rotated at intervals applying a series of tangential impulses to the work in the direction of the drive so long as the power is applied and the tool is held in operative engagement with the work, and a normally released jaw clutch between the spindle and the planetary drive to be engaged by the pressure of the tool against the work.

3. In a portable power driven rotary tool for driving and setting nuts, bolts, screws and the like, a tool spindle, means for communicating torque from said source of rotary motion to said spindle and releasing said torque at a pre-determined intensity, comprising planetary gearing, said planetary gearing having a rotary carrier, and orbital gear members connected at one end of the planetary drive to said source and at the other end to said spindle to rotate the spindle when the carrier is stationary, and releasable means for locking the carrier comprising a locking member carried by a stationary portion of the machine, a spring tending to advance the locking member and a socket in the carrier to be engaged by the locking member, one of the engaging surfaces of the socket and the carrier being inclined backwardly and in the direction of release of the locking member so that an excess torque applied to the tool has the effect of releasing the locking member against the tension of the spring, permitting the carrier to rotate and discontinuing the driving action of the planetary gear.

4. In a portable power driven rotary tool for driving and setting nuts, bolts, screws and the like, a tool spindle, means for communicating torque from said source of rotary motion to said spindle and releasing said torque at a pre-determined intensity, comprising planetary gearing, said planetary gearing having a rotary carrier, and orbital gear members connected at one end of the planetary drive to said source and at the other end to said spindle to rotate the spindle when the carrier is stationary and releasable means for latching the carrier comprising a locking member carried by a stationary portion of the machine, a spring tending to advance the locking member and a socket in the carrier to be engaged by the locking member, one of the engaging surfaces of the socket and locking member being inclined backwardly and in the direction of release of the tooth so that an excess torque applied to the tool has the effect of releasing the locking member against the tension of the spring, permitting the carrier to rotate and terminating the driving action of the planetary gear.

5. In a portable power driven rotary tool for driving and setting nuts, bolts, screws and the like, a tool spindle, means for communicating torque from said source of rotary motion to said spindle and releasing said torque at a pre-determined intensity, comprising planetary gearing, said planetary gearing having a rotary carrier, and orbital gear members connected at one end of the planetary drive to said source and at the other end to said spindle to rotate the spindle when the carrier is stationary and releasable means for locking the carrier comprising a tooth carried by a stationary portion of the machine, operating transversely to the axis of the tool, a spring tending to advance the tooth and a socket in the carrier to be engaged by the tooth, one of the engaging surfaces of the socket being inclined backwardly and in the direction of release of the tooth so that an excess torque applied to the tool has the effect of releasing the locking means against the tension of the spring, permitting the carrier to rotate and terminating the driving action of the planetary gear.

6. In a portable power driven rotary tool for driving and setting nuts, bolts, screws and the like, a tool spindle, means for communicating torque from said source of rotary motion to said spindle and releasing said torque at a pre-determined intensity, comprising planetary gearing, said planetary gearing having a rotary carrier, and orbital gear members connected at one end of the planetary drive to said source and at the other end to said spindle to rotate the spindle when the carrier is stationary, and releasable means for locking the carrier comprising a locking member carried by a stationary portion of the machine and moving transversely to the tool, also a spring tending to advance the locking member and a socket in the carrier to be engaged by the same, one of the engaging surfaces of the socket and locking member being inclined forwardly and in the direction of release of the locking member so that an excess torque applied to the tool has the effect of retracting the locking member against the tension of the spring, permitting the carrier to rotate and terminating the continuous drive, the locking member being adapted to reengage and release at intervals when subject to an overload so long as the power is applied and the tool is maintained in driving engagement with the work producing a rapid tapping action on the work in a tangential direction in addition to the rotary driving action first applied to the work.

7. In a portable power driven rotary tool for driving screws and bolts and running nuts, a source of rotary motion, a tool spindle, means for transmitting rotary motion from the source to the tool spindle, comprising a planetary drive having a rotary carrier, and orbital gear members mounted on the carrier to drive the tool spindle when the carrier is stationary and to rotate without driving action when the carrier rotates, overload releasing means for locking the carrier to hold it stationary, the tool spindle being driven in rotation when the carrier is locked and being stationary when an excess resistive torque is encountered and the carrier rotates.

KENNETH E. WHITNEY.
ALONZO G. DECKER.